J. C. GOVE.
PRESERVING HOUSE.
No. 60,716. Patented Jan. 1, 1867.
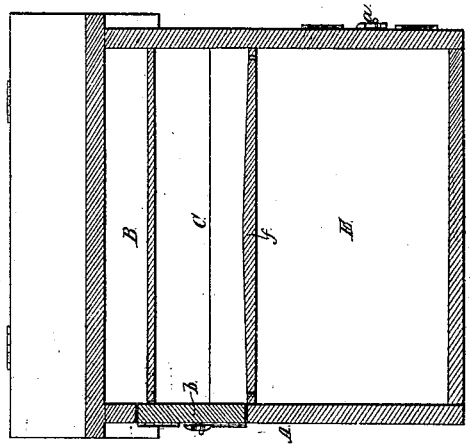
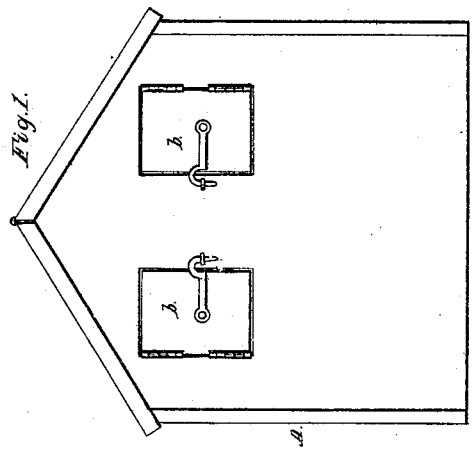
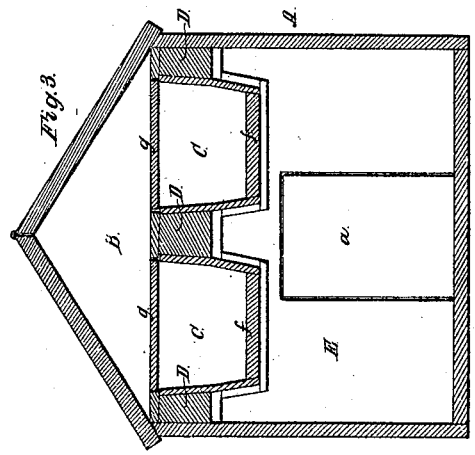

United States Patent Office.

JOHN C. GOVE, OF CLEVELAND, OHIO.

Letters Patent No. 60,716, dated January 1, 1867.

---

IMPROVED PRESERVING-HOUSE.

---

The Schedule referred to in these Letters Patent and making part of the same.

---

TO ALL WHOM IT MAY CONCERN:

Be it known that I, JOHN C. GOVE, of Cleveland, in the county of Cuyahoga, and State of Ohio, have invented certain new and useful improvements in "Fruit and Meat-Preserving Houses;" and do hereby declare that the following is a full, clear, and exact description of the same, reference being had to the accompanying drawings and the letters of reference marked thereon, making a part of this specification.

Figure 1 represents an end view.

Figure 2 represents a longitudinal vertical section through one of the doors, $b$.

Figure 3 represents a cross-section.

My invention consists in the construction of a suitable-sized house, made of wood or metal, or both, for the preservation of the various kinds of fruits or meats, and one that will prevent or obviate the large amount of ice ordinarily used for that purpose.

In the annexed drawings, A represents the house and C C a series of ice-chambers, made in the form as shown, and placed near the roof of the house. Between each ice-chamber and the sides of the house, and between the chambers themselves, are air-chambers, D D. The ice-boxes are covered by suitable lids, $g\ g$, so that the tops of them and the tops of the air-chambers together form a floor, whereupon is placed saw-dust, straw, or other non-conductors, filling the receptacle B. The bottoms of the ice-boxes are made higher in the centre than at the ends, (as seen at $f$, fig. 2,) to draw the water out of the house. E represents the room which is directly beneath the ice-boxes, and wherein the fruit or meat is placed, the ice cooling the air in the chambers, when it descends and keeps the fruits or meats in their perfect state. At each end of the fruit-house there are doors; the door $a$ is to open into the preserving-room, while the doors $b\ b$ open into the ice-boxes, so that any one of said boxes may be refilled without disturbing the other or the articles in the preserving-room, while there can be a pipe of any description passing through the house for ventilation.

Having thus fully described my invention, what I claim as new, and desire to secure by Letters Patent, is—

1. The ice-chambers or boxes C C, arranged above the preserving-room E and below the receptacle B, said boxes being separated from each other and the sides of the house by air-chambers, D D, and being provided with doors at their ends and outside of the house, as and for the purpose herein specified.

2. The arrangement of the fruit-house A with a room, E, for preserving fruit, &c., with ice-boxes, C C, chamber or receptacle B, and air-spaces D D, the preserving-room and ice-chambers being provided with doors, which are separate and distinct, and opening into each from the outside of the house, as and for the purpose specified.

As evidence that I claim the foregoing I have hereunto set my hand in presence of witnesses.

JOHN C. GOVE.

Witnesses:
  J. HALLE,
  J. E. HALL.